United States Patent [19]

Soltis

[11] Patent Number: 4,836,578

[45] Date of Patent: Jun. 6, 1989

[54] HIGH RESOLUTION DIGITAL SUSPENSION POSITION SENSOR FOR AUTOMOTIVE VEHICLE

[75] Inventor: Michael W. Soltis, Dearborn, Mich.

[73] Assignee: Ford Motor Company, Dearborn, Mich.

[21] Appl. No.: 138,266

[22] Filed: Dec. 28, 1987

[51] Int. Cl.[4] .............................................. B60G 17/00
[52] U.S. Cl. .................... 280/840; 324/208; 280/708; 267/64.16
[58] Field of Search ............... 280/6 R, 6.1, 6 H, 703, 280/707, 840, 708; 324/208; 310/DIG. 3; 267/64.16

[56] References Cited

U.S. PATENT DOCUMENTS

| | | | |
|---|---|---|---|
| 3,473,109 | 10/1969 | Maaz et al. | 324/208 |
| 4,105,216 | 8/1978 | Graham et al. | 280/6 R |
| 4,107,604 | 8/1978 | Bernier | 324/208 |
| 4,204,158 | 5/1980 | Ricouard et al. | 324/208 |
| 4,310,172 | 1/1982 | Claude et al. | 280/703 |
| 4,377,293 | 3/1983 | Senoo | 280/6 R |
| 4,433,849 | 2/1984 | Ohmori | 280/6 R |
| 4,453,725 | 6/1984 | Kuwana et al. | 280/6 R |
| 4,555,120 | 11/1985 | Frait et al. | 280/6.1 |
| 4,630,840 | 12/1986 | Masuda et al. | 280/6 R |
| 4,718,695 | 1/1988 | Kawagoe | 280/6 R |
| 4,746,133 | 5/1988 | Hanser et al. | 280/6 R |

Primary Examiner—Richard A. Bertsch
Attorney, Agent, or Firm—Jerome R. Drouillard; Roger L. May

[57] ABSTRACT

A sensor for determining the operational position of an automotive suspension including two members relatively movable with respect to one another includes an assembly with the first component movable with respect to a second component, with the first and second components being relatively movable with respect to each other as a result of the movement of the vehicle suspension. A sensor according to this invention will further include, without limitation, a signal generation device associated with said first and second sensor components for generating a plurality of non-unique digital position signals.

11 Claims, 4 Drawing Sheets

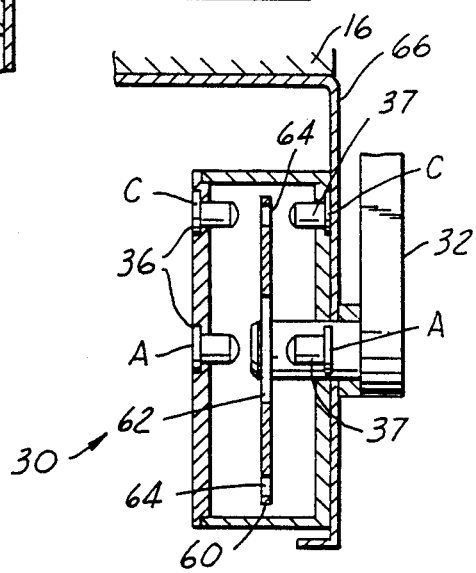

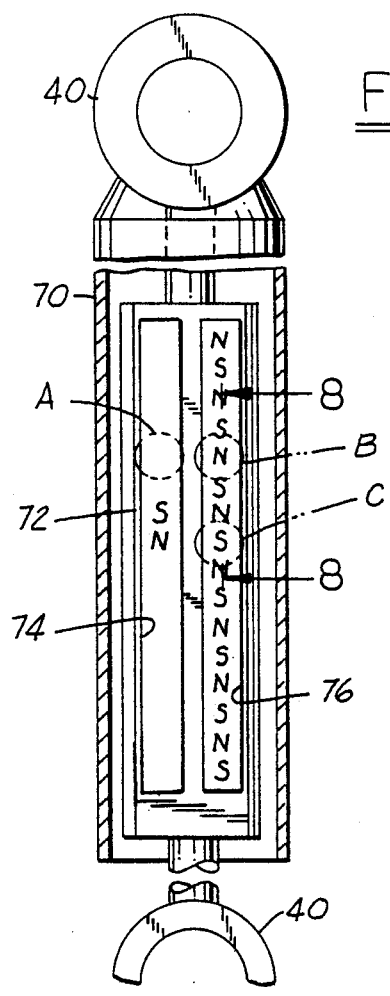
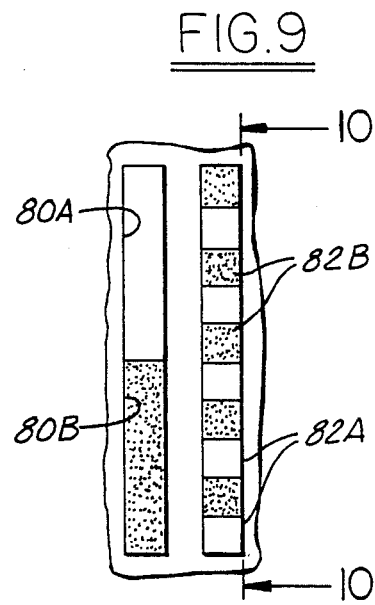
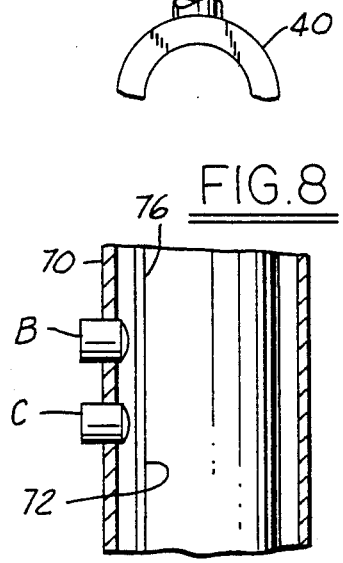
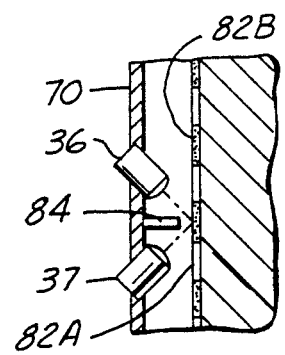

FIG. 11
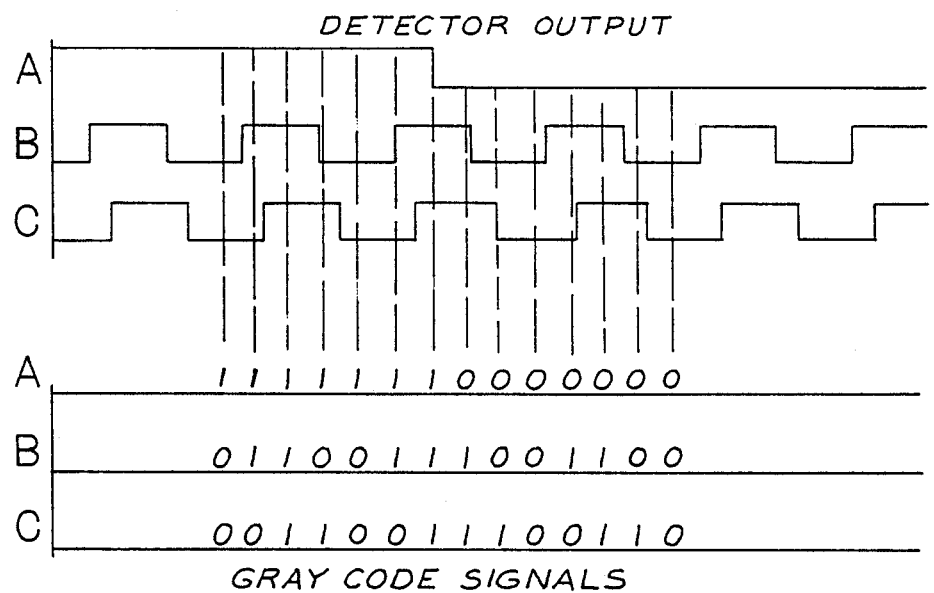
DETECTOR OUTPUT
GRAY CODE SIGNALS
A  1 1 1 1 1 1 1 0 0 0 0 0 0 0
B  0 1 1 0 0 1 1 1 0 0 1 1 0 0
C  0 0 1 1 0 0 1 1 1 0 0 1 1 0
FIG. 12

HIGH RESOLUTION DIGITAL SUSPENSION POSITION SENSOR FOR AUTOMOTIVE VEHICLE

BACKGROUND OF THE INVENTION

1. Field of the Invention

This invention relates to a high resolution digital suspension position sensor for an automotive vehicle.

2. Disclosure Information

Automotive suspensions employing adjustable suspension units typically utilize one or more sensors for detecting the position of one or more portions of the suspension with respect to either another part of the suspension itself or another part of the chassis of the vehicle. In the case of vehicles using load leveling or air or hydropneumatic suspension systems, it is necessary to know the ride height of the vehicle in order to determine whether correction of the ride height is required. In the event, for example, that the ride height is lower than a prescribed "trim" limit, as determined by the height sensor, an adjustable suspension unit may be given a command to increase ride height. Conversely, in the event that the ride height exceeds the prescribed "trim" limit, the adjustable suspension unit may be given a command to lower, or decrease, the ride height.

Vehicular height sensors are useful not only with ride height adjusting systems but also as transducers for use with adjustable suspension dampers. A sensor according to the present invention is useful for providing not only suspension position information but also ride height information for use with a vehicle leveling system or an air or hydropneumatic adjustable suspension or other type of adjustable suspension system.

U.S. Pat. No. 4,105,216 discloses a motor vehicle level control circuit in which a pair of optical detectors interacts with a rotary shutter device to produce a first logic signal pair when the vehicle's ride height is in a trim region, and second and third logic signal pairs when the vehicle's ride height is either high or low and out of the trim region. The system of the '216 patent has the capability of producing only three logic signal pairs with two detector devices. A sensor according to the present invention, however, will easily have the capability to produce, with only three detector devices, a digital output defining thirty-two or more ride height states. For this reason, the present sensor is deemed to be a "high resolution sensor".

U.S. Pat. No. 4,453,725 discloses a rotary height sensor using a bifurcated shutter and three optical devices in order to produce a sensor which resolves vehicle ride height into five possible levels.

U.S. Pat. No. 4,433,849 discloses a vehicle leveling system having two reference vehicle height positions requiring separate detectors for each reference vehicle ride height position.

U.S. patent application No. 126,082, entitled "Automotive Suspension Control System Including Suspension Position Sensor", which was filed on Nov. 27, 1987, and which is assigned to the assignee of the present invention, discloses a vehicle height sensor in which two detector devices are used to produce a digital output having four discrete states.

A variety of sensing techniques have been employed with vehicular height sensors. These include, without limitation, electro-optical devices, linear variable differential transformers, and Hall Effect devices. Examples of the latter are disclosed in U.S. Pat. Nos. 3,473,109; 4,107,604; 4,204,158; and 4,555,120, which are hereby incorporated by reference. U.S. Pat. 4,310,172 discloses an adjustable suspension unit having an internal Hall Effect ride height sensor of conventional design. A sensor according to the present invention may utilize Hall Effect detectors or electromagnetic reed switches, or optical devices, or yet other types of known detecting devices.

It is an object of the present invention to provide a digital output height sensor capable of accommodating a plurality of reference vehicle ride height positions with a single height sensor containing only three detectors.

It is an advantage of the present invention that a suspension position sensor according to this invention will furnish much more information than prior art sensors having a like number of detector devices.

Other objects, features and advantages of the present invention will become apparent those skilled in the art to which this invention pertains.

SUMMARY OF THE INVENTION

According to the present invention, a sensor for determining the operational position of an automotive suspension including two suspension members relatively movable with respect to one another comprises an assembly including a first sensor component movable with respect to a second sensor component, and means for attaching the first sensor component to one of the relatively movable suspension members and the second sensor component to the other of the relatively movable suspension members such that the first and second sensor components will be caused to move with respect to one another when the suspension members move with respect to one another. A sensor according to this invention further comprises digital signal generation means associated with the first and second sensor components for generating a plurality of non-unique digital position signals. The signal generation means preferably comprises digital detector means for producing a cyclic digital code. This code may comprise a Gray code or any other suitable cyclic digital code.

The digital detector means included in the present invention may comprise Hall Effect switches or electro-optical switches, or other types of switching devices suitable for digital equipment. The detector means may therefore comprise a magnet means associated with the first sensor component and a plurality of spaced-apart Hall effect devices associated with the second sensor component such that a digital code will be generated when the magnet means is moved in proximity to the Hall Effect devices as the first sensor component is moved with respect to the second sensor component. In this embodiment, the magnet means could comprise a plurality of magnet strips having alternating North and South poles.

If the detector means includes electro-optical devices, these paired devices could be associated with the second sensor component and employed in conjunction with a multi-tiered interrupter associated with the first sensor component such that a digital code is generated when the interrupter is moved past paired electro-optical devices. The sensor may comprise a linear or a rotary device. Accordingly, the multi-tiered interrupter may comprise either a structure having two or more columns of apertures or a structure having two or more circular or semi-circular rows of apertures.

BRIEF DESCRIPTION OF THE DRAWINGS

FIG. 3 is a broken away, partially schematic section of a linear sensor as shown in FIG. 1, and having electro-optical switches.

FIG. 4 is a partial sectional view of the linear sensor of FIG. 3, taken along the line 4—4 of FIG. 3.

FIG. 5 is a broken away, partially schematic section of the rotary sensor shown in FIG. 2.

FIG. 6 is a partial sectional view of the rotary sensor of FIG. 5, taken along the line 6—6 of FIG. 5.

FIG. 7 shows a broken away, partially schematic perspective view of a second embodiment of a combination linear sensor and shock absorber according to the present invention, having Hall Effect switches.

FIG. 8 illustrates a partial section of the device of FIG. 7, taken along the line 8—8 of FIG. 7.

FIG. 9 contains a broken away partial section of a second type of combination linear sensor and shock absorber according to the present invention, utilizing reflective strip technology.

FIG. 10 illustrates a partial section of the device of FIG. 9, taken along the line 10—10 of FIG. 9.

FIG. 11 shows examples of detector outputs and corresponding digital Gray code signals for one embodiment of a height sensor according to the present invention.

FIG. 12 is an overall system block diagram in accordance with an embodiment of this invention.

DETAILED DESCRIPTION OF THE PREFERRED EMBODIMENTS

Figure 1:
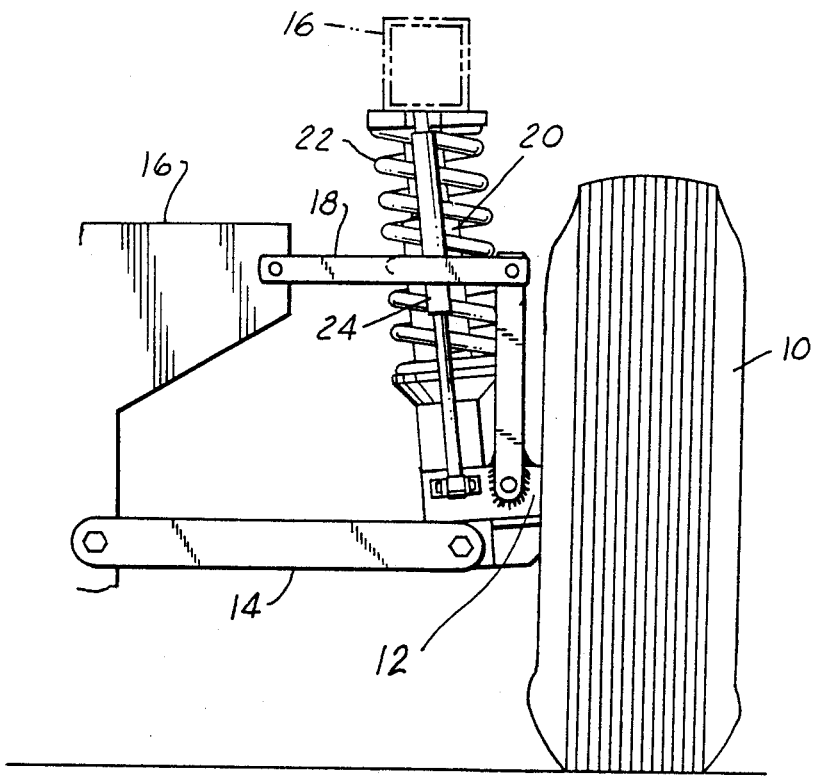
FIG. 1 is a frontal elevation of an automotive suspension equipped with a telescoping or linear suspension position sensor according to the present invention.
Figure 2:
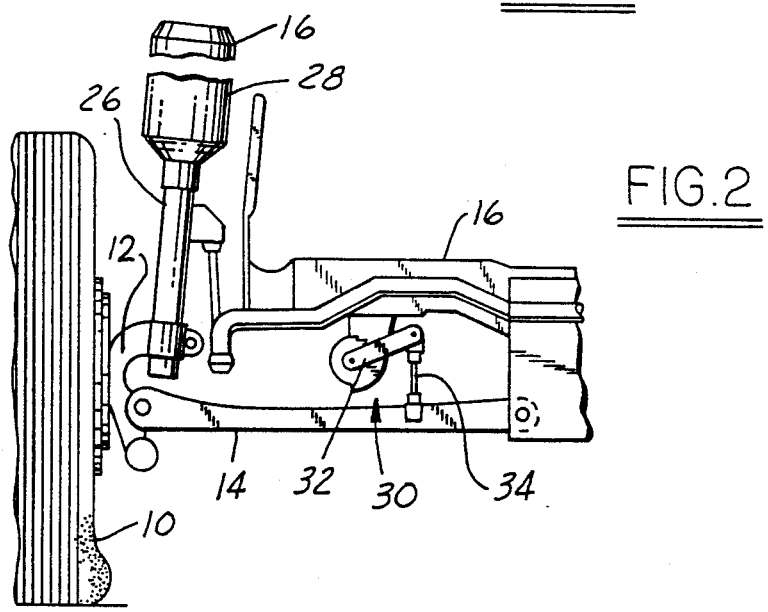
FIG. 2 is a frontal elevation of an automotive suspension equipped with a rotary suspension position sensor according to the present invention.

As shown in FIGS. 1 and 2, a suspension position sensor according to the present invention is intended for use with an automotive suspension including road wheel and tire assembly 10, which is rotatably attached to wheel carrier 12. Each of the suspensions shown in FIGS. 1 and 2 includes a lower control arm, 14, having an inboard end pivotally attached at its inboard end to body or chassis 16, and an outboard end pivotally attached to wheel carrier 12. The suspension shown in FIG. 1 also includes upper control arm 18, which is pivoted between the upper end of wheel carrier 12 and chassis 16, and suspension spring 22, which is interposed between a first spring seat associated with lower control arm 14, and a second spring seat associated with chassis 16. As such, the chassis comprises part of the suspension because it includes attachment points for the various moving parts of the suspension. Finally, the suspension of FIG. 1 also includes adjustable suspension unit 20 and linear position sensor 24, which is mounted between wheel carrier 12 and chassis 16 such that vertical movement of road wheel 10 will be accompanied by telescoping movement of sensor 24.

In addition to the elements previously enumerated, the suspension of FIG. 2 includes adjustable MacPherson strut 26, having a lower end which is rigidly attached to wheel carrier 12, and an upper end which extends through ride height adjuster 28. The upper end of strut 26 extending above ride height adjuster 28 is resiliently or pivotally attached to the chassis of the vehicle in conventional fashion. The suspension of FIG. 2 is completed by rotary position sensor 30, which serves to sense the vertical position of the road wheel with respect to the chassis. As many be seen from FIG. 2, this sensing results from the connection of position sensor 30 between chassis 16 and lower control arm 14 such that the motion of lower control arm 14 which accompanies vertical movement of the road wheel will be translated into rotary motion of the sensor by crank arm 32 and connecting link 34.

Those skilled in the art will appreciate in view of this disclosure that although the present suspension systems have been described in view of well-known parallel arm and MacPherson strut configurations, a height sensor according to the present invention could be utilized with a variety of suspension configurations including modified MacPherson strut, Hotchkiss, quadralink, or other types of suspension configurations. It will further be appreciated that a sensor according to the present invention could be utilized with suspension systems featuring not only controllable damping or controllable ride height, but also those systems in which both damping and ride height are controlled. Further, the sensor disclosed herein would likely be useful for providing operational data for other types of semi-active or active vehicular suspension systems.

As shown in FIG. 3, linear height sensor 24 includes outer housing 38, having an attachment eye, 40 integral therewith. A similar attachment eye is incorporated into multi-tiered interrupter 42, which is positioned so that it will be moved past a plurality of electro-optical switches 48, which are individually labeled A, B, and C, as the sensor moves telescopically. In other words, interrupter 42 is slidably, or telescopically, received by outer housing 38. Interrupter 42 is said to be multi-tiered because it contains two columns of apertures. Those skilled in the art will appreciate in view of this disclosure that a sensor could be constructed according to this invention with additional columns of apertures in the interrupter, depending upon the data needs of the particular suspension control system being serviced by the sensor.

As previously explained, telescopic movement of sensor 24 accompanies vertical movement of the suspension illustrated in FIG. 1. Accordingly, outer housing 38 and the componentry associated therewith, and interrupter 42 and its associated componentry comprise first and second components which are caused to move with respect to one another when the suspension members move with respect to one another.

FIG. 4 illustrates the composite parts of the electro-optical detectors B and C, it being understood that detector A is of like construction. Each detector set includes a light emitting diode (LED), 36, and a paired photo diode, 37. The paired combination of the LED and photo diode is useful for detecting movement of interrupter 42. This is possible because the photo diodes have two states—i.e., they are bistable. A conducting state occurs whenever light from a paired LED passes through either one of secondary apertures 44 or through primary aperture 46 in interrupter 42 and impinges upon a paired photo diode. The output of the detector circuit then rises to approximately 5 volts. A non-conducting state exists whenever the interrupter blocks the transmission of light between an LED and its paired photo diode. As shown in FIG. 3, the vertical distance separating the midpoints of detectors B and C is labeled with the character "D". This distance is approximately 1.75 times the vertical height of the corresponding edges of two adjacent apertures 44, which is labeled with the character "H". The spacing of the detectors B and C results in the outputs shown in FIG. 11. Depending upon the needs of the system being supplied with data by the sensor, dimension D could be set at 3.75 or 5.75 times the value of dimension H. Such settings will change the number of graduations into which the full range of travel of the sensor will be divided. This will also reduce the useful range of travel over which the sensor is effective. Because interrupter 42, as illustrated in FIGS. 3 and 4, has a total of eight secondary apertures 44 therein, sensor 24 will have the capability of dividing the suspension's vertical travel into 32 discrete graduations. This result flows from the fact that each of the secondary apertures will trigger each of the secondary detectors (i.e., detectors B and C) to undergo two transitions, which will appear as separate digital code words.

The outputs of electro-optical switches A, B and C may be fed into a suspension control module (FIG. 12), which will provide control signals to adjustable suspension units such as those shown in FIGS. 1 and 2. A suspension control module suitable for use with a sensor according to the present invention could include a microprocessor computer configured so that a control program is sequentially read for each unit command from a read-only memory (ROM) which stores preset control programs. Unit commands are executed by a central processing unit (CPU). The processor integrally includes an input-output control circuit (I/0) for exchanging data with external devices and a random access memory (RAM) for temporarily holding data while the data are being processed. Finally, the processor would include a plurality of registers for handling the output information from the sensor. Alternatively, the sensor's output could be directed to an up/down counter for pre-processing prior to usage of the data by the CPU.

FIG. 11 is a partial tabulation of waveforms and resulting Gray code signals from a sensor according to FIGS. 3 and 4. The output of primary detector A (and hence, the portion of the Gray code ascribed to detector A), switches only once during the full stroke of the sensor because primary aperture 46 occupies fully one-half of the working distance of the sensor's stroke. On the other hand, the outputs of secondary detectors B and C exhibit the alternating square waves shown in FIG. 11, which produce the continually switching digital output also shown in FIG. 11 during the stroke of sensor 24.

The Gray code signals noted in FIG. 11 correspond directly to the outputs of detectors A, B and C. The reader will realize that the Gray code is cyclical in nature. In other words, it is a repeating code, with the result that the sensor generates a plurality of non-unique digital position signals. These signals repeat in such a manner that a sequential transition between two particular code words can occur in only one direction. For example, with reference to FIG. 11, the transition from the word 1,1,1 to the word 1,0,1 can only occur while moving from left to right in FIG. 11. Conversely, the transition from the word 1,0,1 to the word 1,1,1 can only occur while moving from right to left. Accordingly, the control module will always know the direction in which the sensor is moving because of the order in which the code word transitions occur. This is worthy of note because code reading accuracy is thereby enhanced, as compared to certain prior art sensors in which identical code words are separated by a single intervening code word.

The Gray code is further characterized by the fact that only one of the three digits in each code word changes from word to word. This is important because it is known by those skilled in the art that two or more events cannot generally be made to reliably occur simultaneously without great difficulty, and the Gray code obviates the need for such transitions.

The output of secondary detectors B and C may be further processed to yield a signal indicating the vertical velocity of the road wheel with respect to chassis 16. This operation is performed quite simply by merely tracking the number of transitions of one or both detectors during a given unit of time. The number of such transitions during the sampling period will be directly proportional to the vertical speed of the road wheel.

FIGS. 5 and 6 include details of a rotary position sensor according to the present invention. The linear interrupter of sensor 24 is replaced by two-tiered shutter wheel 60 having a single primary aperture, 62, and a plurality of 20 secondary apertures, 64. As was the case with sensor 24, sensor 30 includes three electro-optical switches, which are labeled A, B and C. FIG. 6 shows the opposed LED and photo diode pairs A and C. Because the shutter wheel contains 20 secondary apertures, sensor 30 will have the ability to divide up a single revolution of the sensor into eighty 4.5 degree increments.

The three diode pairs in rotary sensor 30 interact with shutter wheel 60 in much the same manner as the diode pairs of sensor 24 interact with interrupter 42. Accordingly, the output waveforms and Gray code resulting from sensor 30 have the form shown in FIG. 11. As before, the portion of the digital signal attributable to electro-optical switch A changes only once during the full range of operation of the sensor, because of primary aperture 62. Accordingly, detector A is deemed to be the primary detector.

As shown with particularity in FIG. 6, height sensor assembly 30 is mounted by means of bracket 66 to vehicle chassis 16. Shutter wheel 60 housed within the sensor is coupled with suspension control arm 18 by means of crank arm 32 and connecting link 34 (FIG. 2). Accordingly, when road wheel and tire assembly 10 moves vertically in jounce and rebound, crank arm 32 and connecting link 34 will cause a translation of the corresponding vertical movement of suspension control arm 14 with respect to chassis 16 into rotary motion of shutter wheel 60 which is attached to crank arm 32.

Regardless of the particular type of switch or sensor configuration chosen for implementing a sensor according to the present invention, the previously described suspension control module associated with the sensor will be able to keep account of the vertical position of the suspension at all times by monitoring the coded transitions received from the sensor.

Detector A of each of the illustrated position sensors will provide continuous information regarding whether the suspension is in a "high" or "low" position, provided the transition point of detector A is placed at a suspension ride height level corresponding to the desired "trim" level. This may be accomplished by adjusting the position of the primary aperture within either interrupter 42 or shutter wheel 60 such that the 1,1,1 code word occurring at the mid-position of the Gray code output (see FIG. 11) may be situated at the precise ride height deemed to be the trim level. It is worthy of note that, as illustrated in FIG. 11, transition from a 1,1,1 code word to a 0,1,1 code word can occur only at the center of the sensor's travel —at the point where detector A switches state; this is significant because the suspension control module will know that the trim position has been reached once this transition occurs.

As explained above, the processor will know from the activity of detector A whether the ride height is high, low, or in trim. Detector A cannot, however, reveal the precise position of the suspension within the high or low portions of the sensor's travel. This task is the work of detectors B and C. The process of keeping account of the activity of detectors B and C could be implemented by incrementing a counting register by one ride height graduation each time one of the two secondary detectors (i.e., detectors B and C) changes its output state. In effect, the processor would therefore count up or down from the trim level to obtain a reading of the actual ride height.

In the event that multiple stabilized ride height positions are desired for a given vehicle, the control module could give a command to raise or lower the vehicle from the trim position and thereafter count the transitions of the secondary detectors until a predetermined adjusted ride height is reached.

FIGS. 7-10 illustrate two forms of an additional embodiment according to the present invention. In FIGS. 7 and 8, three Hall Effect devices, labeled A, B and C are positioned in dust shield 70 of a telescoping shock absorber. Primary magnet strip 74, and secondary magnet strip 76 are positioned upon outer cylinder 72 of the shock absorber. Each of the magnet strips is comprised of ferromagnetic material. Primary magnet strip 74 functions in a manner analogous to primary aperture 46 of interrupter 42. As shown in FIG. 7, magnet strip 74 has a single North/South transition at its midpoint. This transition will trigger Hall Effect device A so as to produce the waveform shown for detector A in FIG. 11. In similar fashion, magnet strip 76 has a plurality of North/South transitions, which will produce the waveforms shown for detectors B and C in FIG. 11. It is thus seen that, in combination, the magnetic strips function in the manner of interrupter 42 of FIGS. 3 and 4. The principle of operation of the Hall Effect switches is well known to those skilled in the art. The cooperation of the Hall Effect switches and the magnet strips 74 and 76 produces the waveforms shown in FIG. 11. When any one of the Hall switches is positioned adjacent one of the South poles of the magnet strips, the switch will be in the "on" state and thereby generate a low level logic signal. Conversely, when one of the switches is adjacent either one of the North poles, the Hall switch will be in the "off" state and the output of the switch will be at a high logic level.

FIGS. 9 and 10 show a second type of height sensor according to the present invention, integrated into a shock absorber. As shown in FIG. 9, a primary reflective strip, 80, has a non-reflective sector 80A and a reflective sector, 80B. Strip 80 functions in the manner of primary magnet strip 74 in conjunction with light emitting diode 36 and photo detector 37 to produce the waveform for detector A shown in FIG. 11. Finally, secondary reflective strip 82, having a plurality of non-reflective and reflective sectors, labeled 82A and 82B, respectively, functions in the manner of secondary magnet strip 76 to generate the waveforms shown for detectors B and C in FIG. 11. It is thus seen that, in combination, the reflective strips function in the manner of interrupter 42 of FIGS. 3 and 4. As shown in FIG. 10, the detectors and light emitting diodes are mounted in the dust shield of the shock absorber such that an LED 36 emits light which is reflected by a reflective portion of either strip 80 or strip 82, as the case may be, and into the appropriate one of detectors 37. Barrier wall 84 is positioned between the LED and its paired detector so as to prevent the impingement of non-reflected light upon detector 37.

Regardless of the type of sensing device employed, the combination shock absorber and digital position sensor devices illustrated in FIGS. 7-10 function to produce position signals in a similar manner to that of the sensor illustrated in FIGS. 3 and 4 in the event that the shock absorber is positioned between two relatively movable suspension members such as the chassis and a lower control arm. For example, the shock absorbers of FIGS. 7-10 could be positioned between lower control arm 14 of FIG. 1 and chassis 16. In this manner the shock absorber will move telescopically as the suspension moves in the jounce and rebound directions, and the waveforms of FIG. 11 will thereby be produced.

The illustrated sensors have the capability to provide much more information with only three channels than do known sensors operating according to other principles, because the cyclical nature of the digital code employed with the present sensors enables these sensors to re-use code words over and over, so that the ultimate capability of the sensor is limited by the capability of the sensor's attaching hardware to input motion into the sensor. If, for example, the interrupter of either a linear or a rotary sensor according to this invention is provided with 8 secondary apertures, a sensor according to this invention could divide the total vertical travel of the suspension into 32 segments. In contrast with the three detector devices needed for a sensor according to this invention, other known sensors relying upon discrete digital signals not of the cyclic type disclosed herein would require five separate detector devices to generate 32 position signals.

Those skilled in the art will appreciate in view of this disclosure that other types of detectors or switches could be employed within a sensor according to the present invention. For example, magnetic reed switches, or electro-mechanical devices, or other types of devices could be utilized. These and all other variations and modifications of the present invention are possible without departing from its spirit and scope as defined by the appended claims.

I claim:

1. A sensor for determining the operational position of an automotive suspension including two suspension members relatively movable with respect to one another, comprising:
    an assembly including a first sensor component movable with respect to a second sensor component;
    means for attaching said first sensor component to one of said relatively movable suspension members and said second sensor component to the other of said relatively movable suspension members such that said first and second sensor components will be caused to move with respect to one another when said suspension members move with respect to one another;
    digital signal generation means associated with said first and second sensor components for generating a plurality of non-unique digital position signals.

2. A sensor according to claim 1 wherein said sensor components comprise component parts of a telescoping shock absorber.

3. A sensor for determining the operational position of an automotive suspension including two suspension members relatively movable with respect to one another, comprising:
an assembly including a first sensor component movable with respect to a second sensor component;
means for attaching said first sensor component to one of said relatively movable suspension members and said second sensor component to the other of said relatively movable suspension members such that said first and second sensor components will be caused to move with respect to one another when said suspension members move with respect to one another;
digital detector means, operatively associated with said first and second sensor components, for generating position signals representative of the position between said two suspension members, with said position signals comprising a repeating digital code.

4. A sensor according to claim 3 wherein said detector means comprises a plurality of Hall Effect switches.

5. A sensor according to claim 3 wherein said detector means comprises a plurality of electro-optical switches.

6. A sensor according to claim 3 wherein said position signals comprise a Gray code.

7. A sensor according to claim 3 wherein said digital detector means comprises a multi-tiered interrupter associated with said first sensor component and a plurality of pairs of spaced apart electro-optical devices associated with said second sensor component, such that said digital code will be generated when said interrupter is moved past said electro-optical devices as said first sensor component is moved with respect to said second sensor component.

8. A sensor according to claim 7 wherein said sensor comprises a linear device and said multi-tiered interrupter comprises a structure having two or more columns of apertures.

9. A sensor according to claim 7 wherein said sensor comprises a rotary device and said multi-tiered interrupter comprises a structure having two or more circular rows of apertures.

10. A sensor according to claim 3 wherein said digital detector means comprises a magnet means associated with said first sensor component and a plurality of spaced-apart Hall effect devices associated with said second sensor component, such that said digital code will be generated when said magnet means is moved in proximity to said Hall effect devices as said first sensor component is moved with respect to said second sensor component.

11. A sensor according to claim 10 wherein said magnet means comprises a plurality of magnet strips having alternating North and South poles.

* * * * *